3,251,903
CROSS-LINKED POLYHALOGENOUS POLYESTER COMPOSITIONS PREPARED BY REACTING POLYHALOGENOUS EPOXIDES WITH ANHYDRIDES
Pauls Davis, Gibraltar, Mich., assignor to Wyandotte Chemicals Corporation, Wyandotte, Mich., a corporation of Michigan
No Drawing. Filed Nov. 9, 1962, Ser. No. 236,684
68 Claims. (Cl. 260—869)

The present invention relates to cross-linked polyester compositions having pendant polyhalogenoalkyl groups, and is more particularly concerned with cross-linked polyhalogenous polyester compositions which have a relatively high order of nonflammability and which in many cases are nonburning as well as self-extinguishing.

The commercial possibilities of polymeric materials based on polyesters were recognized during the 1930's and especially somewhat later during the war years. It was found that these polyester resins could be cast alone or with fibers and strands of synthetic and natural reinforcing materials such as glass fibers, nylon, cotton, sisal, asbestos, as well as many other materials, in fabric, mat, yarn, and chopped or continuous roving form, to give hard, durable, light-weight structural materials. They could be applied to surfaces by spraying, rollercoating, dipping, brushing, or other suitable means to give tough, weather-resistant, thermosetting coatings. The ultra high strength properties of these compositions, combined with their light weight and durability, made them successful competitors for many applications with more conventional structural materials such as steel and aluminum. Many other valuable applications were also found, as in films which could be economically produced and advantageously used as wrapping materials.

However, in spite of the excellent physical and chemical properties of such polyester-based compositions, it was also found that they possess a major disadvantage, and consequently a factor which limits the area of their potential use: they are flammable and burn readily. Safety requirements as imposed by insurance underwriters and civic ordinances dictate that materials more resistant to fire be used.

Several approaches have therefore been suggested to improve the flame resistance of these materials, and thereby correct this weakness. These systems generally involve the incorporation of flame-resistant materials or elements into the composition, either as a coating, a physically or chemically contained fire retarder, or as an integral part of one of the reactants.

Coatings are usually the least effective, and therefore least desirable, since a break or crack or some other form of coating deterioration renders the underlying composition unprotected against fire destruction. A more effective, and generally more economical system, involves incorporating a fire retarding filler or additive, generally preferred compounds being inorganic salts, borates, silicates, antimony oxides, phosphates and phosphites and derivatives thereof, in the composition during some stage of its preparation, usually the final polymerization stage. Some of the more readily available fire retarding compounds which are useful for this purpose are sufficiently stable under mild exposure conditions, but break down upon exposure to weathering and/or moderate temperature cycling, thereby causing the polymer to lose whatever flame resistance it might have had originally. Thus, the costly step of incorporating such additives in the plastic may be undertaken without the realization of any permanent benefit.

It has also been found that polyester compositions having improved fire resistance may be prepared by incorporating hexachloroendomethylene tetrahydrophthalic anhydride and like materials therein. Compositions so prepared are generally "self-extinguishing," meaning that they will burn when exposed to a flame source and will, at best, stop burning after the flame source has been removed and before being completely consumed. Materials treated in this way are therefore still liable to extensive damage if directly exposed to fire. Even though such modified compositions represent an improvement in the art, they are far less fire resistant than desired and are thus inadequate for many purposes.

It is an object of the present invention to provide a new and useful class of cross-linked polyhalogenous polyesters which have a high degree of nonflammability, and which in many cases are nonburning. An additional object is the provision of a novel class of cross-linked polyhalogenous polyesters which have permanent fire-resistant properties. Another object is to provide a new class of cross-linked polyesters having a high degree of resistance to chemicals and solvents. A further object is the provision of a new class of cross-linked polyesters having improved water absorption properties. Still an additional object is to prepare a new class of cross-linked polyhalogenous polyester resins which can be molded alone or with reinforcing materials to give hard, durable plastics which may be used for a variety of structural, construction, and manufacturing applications where increased fire resistance is advantageous and desired. Still another object is to provide a valuable class of cross-linked polyester resins which may be applied to surfaces to give tough, durable, fire- and chemical-resistant coatings. Yet another object is to provide a novel class of cross-linked polyhalogenous polyesters which exhibit a low degree of heat distortion, thus minimizing cold flow. A still further object is to provide a method for preparing the novel and valuable cross-linked polyhalogenous polyesters of the present invention. Additional objects will be apparent to one skilled in the art and still other objects will become apparent hereinafter.

It has now been found that the foregoing and additional objects are accomplished by the provision of novel ethylenically unsaturated polyesters characterized by pendant polyhalogenoalkyl groups which are cross-linked with ethylenically unsaturated cross-linking agents. The resulting polyester compositions are characterized by pendant polyhalogenoalkyl groups, and by a relatively high order of nonflammability and chemical resistance, and in many cases are nonburning. By "nonburning" is meant that the polyester composition will not burn even when directly exposed to a flame. Depending on the reaction components and their ratios, the polyester resins range from soft and elastic to very hard materials, and may be used in almost all applications where polyester resins are currently used, but to give products having increased nonflammability and chemical resistance. For instance, they may be molded or cast with reinforcing materials of various kinds, such as natural and synthetic fibers, including glass fibers, nylon (polyamide and polyester), sisal, asbestos, cotton and so forth, to give strong durable laminates which have an extremely high degree of nonflammability. They may be applied to surfaces to give tough, weather-, fire-, and chemical-resistant coatings.

POLYESTERS

The ethylenically unsaturated polyesters used to prepare the cross-linked polyester compositions of the present invention are polyesters having a relatively high halogen content and characterized by pendant lower-alkyl groups having up to two carbon atoms and containing at least two halogen atoms, said pendant polyhalogenous lower-alkyl groups being built into the polyester as exo substituents of an oxyalkylene moiety in the polyester chain. When modified with ethylenically unsaturated cross-linking agents, the polymer chains of these polyesters cross-link through their sites of unsaturation via the cross-linking agent to give a three-dimensional polymeric system wherein the pendant polyhalogenoalkyl groups of the unmodified polyester appear as exo or pendant substituents of the modified system. The starting polyesters are polyesters of an organic dicarboxy compound and a polyhalogenous alkylene oxide. They may be prepared by reacting (a) an ethylenically unsaturated organic dibasic acid anhydride or acid or mixtures thereof, or mixtures of the foregoing with a nonethylenically unsaturated dibasic acid or anhydride (which is preferably free of other than aromatic unsaturation) and (b) one or more polyhalogenous alkylene oxides, or mixtures of a polyhalogenous alkylene oxide with a nonpolyhalogenous alkylene oxide (which is also preferably saturated or free from other than aromatic unsaturation). Essentially, the polyhalogenous alkylene oxide, and nonpolyhalogenous alkylene oxide if employed, reacts with the dicarboxy compound to give a polymer chain comprising alternating acid and oxyalkylene units, one or two or more of such oxyalkylene units being joined in the polymer chain depending on the ractants and ratio of reactants, the polymer chain being characterized by pendant polyhalogenoalkyl groups.

Thus, the recurring units of the preferred starting unsaturated polyesters of the invention may in general be depicted by the formula:

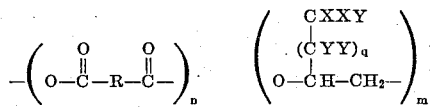

wherein R is the residue of the ethylenically unsaturated dibasic acid (or anhydride), Y is hydrogen or halogen, and X is halogen, wherein $q$ is zero or one, and wherein $n$ and $m$ are small whole numbers usually from 1 to 3, inclusive. This unit formula also includes a third moiety because a nonpolyhalogenous alkylene oxide may be included in the reaction mixture. The additional moiety has the formula:

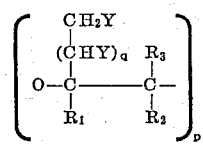

wherein $p$ is zero or a small whole number usually from 1 to 3, inclusive, wherein $R_1$, $R_2$ and $R_3$ can be the same or different and represent hydrogen or a saturated or aromatically unsaturated radical, and wherein only one Y can be halogen. Because a nonethylenically unsaturated dibasic acid or anhydride may also be included in the reaction mixture, a fourth moiety must be included in the unit formula, as follows:

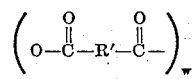

wherein R' is the residue of the saturated or aromatically unsaturated dibasic acid (or anhydride) and $w$ is zero or a small whole number usually from 1 to 3, inclusive. The weight of all of such optionally present third moieties, when present, will preferably not exceed about 50% of the combined weight of all oxyalkylene moieties taken taken together and the weight of all of such optionally present fourth moieties, when present, will preferably not exceed about 40% of the combined weight of all dicarboxylic acid (or anhydride) moieties taken together. The subunits or moieties of the recurring structural units may of course be present in any order. The radical or residue R will be the same whether a particular acid or the corresponding anhydride is employed in preparing the polyester, and designation of R as being the residue or radical of the acid or the anhydride should therefore not be construed as a limitation to the use of either the acid or the anhydride as starting material in the preparation of the polyester; the same is true with regard to R'.

The polyhalogenous alkylene oxides used to prepare the unsaturated polyesters are vicinal alkylene oxides, containing up to four carbon atoms, having an alkyl group attached to a carbon atom of the oxirane ring, said alkyl group having up to two carbon atoms and containing at least two halogen atoms. Representative of this class of alkylene oxides are 1,1 - dichloro - 2,3 - epoxypropane, 1,1,1-trichloro-2,3-epoxypropane, 1,1,1 - trifluoro - 2,3-epoxypropane, 1 - bromo-1,1-dichloro-2,3-epoxypropane, other mixed 1,1,1 - trihalo - 2,3-epoxypropanes, 1,1,1-trichloro-3,4-epoxybutane, 1,1-difluoro-1-chloro-2,3 - epoxypropane, 1,1-dichloro-1-fluoro-2,3-epoxypropane, 1,1,1-tribromo-3,4-epoxybutane, 1,2-dibromo-3,4-epoxybutane, 1,1,1,2,2-pentachloro-3,4 - epoxybutane, 1,1,1,2,2 - pentafluoro-3,4-epoxybutane, 1,1,1,2,2 - mixed pentahalo - 3,4-epoxybutanes, et cetera. Preferably all of the valences of the terminal carbon atom of the alkyl group are satisfied by halogen atoms, or alternatively the halogen atoms present are preferably present on the terminal carbon atom of the alkyl group.

Any halogen or combination of halogens may be present in the starting polyhalogenous alkylene oxide, and consequently also in the pendant polyhalogenous loweralkyl groups built into the polyester. Of the halogens, chlorine, fluorine, and bromine are preferred, and the halogen therefore has an atomic weight of 19 to 80, inclusive.

In general, the higher the halogen content of the pendant polyhalogenoalkyl groups of the polyester, the better the over-all fire resistance and chemical resistance of the final cross-linked polyester products. For this reason starting alkylene oxides containing more than two halogen atoms on the alkyl substituent of the oxirane ring are preferred over the corresponding alkylene oxides containing only two halogen atoms. By way of example, 3,3,3-trichloropropylene oxide, which contains three halogen atoms on the terminal carbon of the polyhalogenoalkyl group, is preferred over the corresponding dihalogenoalkylene oxide, 3,3-dichloropropylene oxide. The preferred halogen content by weight in the starting polyester is at least 25% and preferably 35 to 55%.

When these polyhalogeneous alkylene oxides react, the oxirane ring is opened with the breaking of an oxygen-carbon bond to give a bivalent unit wherein the members of the oxirane ring form a bivalent linear chain having the polyhalogenous lower-alkyl group, originally attached to a carbon atom of the oxirane ring, as an exo substituent. By its reaction with the acid or anhydride, this bivalent unit is bonded through the two free valences to other components of the polyester, thereby locating it in and along the polyester chain as a polyhaloalkyloxyalkylene group or radical and building the polyhalogenous lower-alkyl group into the polyester as an exo substituent. This bivalent oxyalkylene radical may be bonded through both valences by way of ester linkages to acid radicals, or it may be bonded through one or both valences to additional oxyalkylene radicals to form a polyoxyalkylene chain. The average length of the oxyalkylene chains forming a polyether moiety in the polyester chain is determined by the precise reactants, the reaction time, and ratio of reactants, as more fully explained hereinafter.

The acid anhydride or acid compounds used in formation of the starting unsaturated polyesters are organic dibasic acid anhydrides and acids which contain ethylenic unsaturation and which preferably have up to and including 12 carbon atoms per molecule. Representative compounds include acids and anhydrides such as maleic, fumaric, chloromaleic, itaconic, citraconic, mesaconic, tetrahydrophthalic acid, tetrahydronaphthalene dicarboxylic anhydride, et cetera. These dibasic acid anhydrides and acids can be used singly or in mixtures of acids with anhydrides, as well as in mixtures with other dibasic acids and/or anhydrides containing no ethylenic unsaturation and which preferably are saturated or free of other than aromatic unsaturation. When such mixtures of ethylenically unsaturated carboxy compounds and carboxy compounds containing no ethylenic unsaturation are used, the ethylenically unsaturated component of the mixture should be present in amount of at least about 40 percent, preferably at least 60 percent, by weight of the mixture, in order to provide sufficient sites for cross-linking. When less than the preferred minimum is used, cross-linked plastics derived from the resulting polyester tend to be softer and more flexible, with a decline in other desirable properties of the plastic. Usually, for plastics having optimum physical and chemical properties, the amount of ethylenically unsaturated carboxy compound in the mixture exceeds this minimum.

Representative organic dibasic acid anhydrides and acids which are either saturated or free from other than aromatic unsaturation which can be used together with ethylenically unsaturated dibasic acids and anhydrides to prepare the unsaturated polyesters preferably contain up to and including 12 carbon atoms and include aliphatic dibasic acids and anhydrides such as malonic, succinic, perfluorosuccinic, glutaric, perfluoroglutaric, adipic, perfluoroadipic, pimelic, suberic, azelaic, sebacic, et cetra; cycloaliphatic dibasic acids and anhydrides such as tetrahydrophthalic, hexahydroterephthalic, hexachloroendomethylene tetrahydrophthalic, et cetra; aryl dibasic acids and anhydrides such as phthalic, isophthalic, terephthalic, et cetra; and the like.

In general, it is preferred to employ anhydrides rather than acids since the addition reaction of anhydrides and alkylene oxides proceeds without the formation of water of esterification. When acids are used, the water of esterification which forms can be removed from the product by any convenient or conventional procedure, such as by vacuum distillation.

The ability of alkylene oxides to react with carboxy compounds is well known in the art. For instance, Noller (Chemistry of Organic Compounds, W. B. Saunders Co., Philadelphia, 1957, p. 751) mentions that carboxy groups can react with epoxy groups to give esters. However, such a reaction generally gives products which are primarily homopolymers of the alkylene oxide, and in which the carboxy compound merely acts as an initiating molecule for the polyoxyalkylene chain. I have found the same undesirable result to occur when a monohalogenous alkylene oxide is used in the reaction. For this reason the ostensibly advantageous and convenient method of preparing polyesters by the direct use of alkylene oxides has not been heretofore utilized. It has, however, now been found that, when the polyhalogenous alkylene oxides are reacted with dicarboxy compounds, viz., acids or anhydrides, the polymerization is such that a polymer chain of alternating polyhaloalkyloxyalkylene and acid units is obtained. Evidently the presence of the polyhalogenous lower-alkyl group attached to the oxirane ring of the polyhalogeneous alkylene oxide deactivates the oxide so that its reactivity toward more active carboxy groups of the dicarboxy compound is considerably greater than toward other alkylene oxide molecules, thereby keeping the less desirable homopolymerization of the oxide to a minimum. Studies to confirm this hypothesis have revealed that in this reaction the first mol of oxide reacts considerably faster than the second, which in turn reacts faster than the third. In practice, it has been found that when the oxide and acid or anhydride are reacted in equimolar quantities, polyesters are obtained which essentially comprise alternating acid and polyhaloalkyloxyalkylene groups, although a small through not detrimental amount of homopolymerization may occur. When the proportion of oxide to acid or anhydride is increased, a polyester is obtained wherein the acid units are separated by longer polyether units consisting of two or more polyhaloalkyloxyalkylene groups.

In the formation of the unsaturated polyesters used in the present invention, it is possible to vary the proportions of alkylene oxide to dicarboxy compound over a considerable range. The polyesters so formed and, in turn, the cross-linked compositions derived from these polyesters, are of somewhat varied character depending on the proportions of alkylene oxide and dicarboxy compound used. The preferred range in an individual case depends on a number of factors including properties desired in the cross-linked compositions based on the polyester, the exact reactants employed, and so forth. For example, ethylenically unsaturated polyesters having good color and workable viscosities are prepared by reacting 3,3,3-trichloropropylene oxide with maleic anhydride in a molar ratio of two of the former to one of the latter in the presence of an aluminum chloride catalyst. When cross-linked with a suitable amount of an unsaturated monomer such as styrene, a hard, durable, nonburning plastic having a high degree of chemical resistance is obtained. A polyester having a higher cross-link density, that is, a higher concentration of sites of unsaturation, may be obtained by reducing the ratio of trichloropropylene oxide to maleic anhydride to one to one. Such polyesters can be more highly cross-linked and consequently cross-linked products produced therefrom have a harder, more rigid structure than compositions prepared from polyesters having lower cross-link densities. By increasing the ratio to three to one or higher, polyesters having decreased cross-link densities are obtained, from which are produced cross-linked products which are generally more flexible and less hard. In most instances, when preparing the ethylenically unsaturated polyesters, it is preferred to use no more than three mols of polyhaloalkylene oxide for every mol of dicarboxy compound in order to obtain polyesters having optimum cross-linking densities. At molecular ratios of polyhaloalkylene oxide to ethylenically unsaturated dibasic carboxy compound above three to one, the decreased cross-link density, resulting from the increased average length of the polyether units in the polyester chain and consequently the increased spacing between the unsaturated sites of the polyester, is manifested by a decline in some of the advantageous physical properties of the cross-linked plastic, including hardness and strength, as well as in some of the advantageous chemical properties. For some applications, however, the higher ratios are suitable. In general, the higher the ratio of polyhalogenous alkylene oxide to ethylenically unsaturated dicarboxy compound, other factors being constant, the softer and more elastic the cross-linked polyester composition will be. Ordinarily, ratios of polyhalogenous alkylene oxide to ethylenically unsaturated dicarboxy compound of about one to one to about three to one are preferred although, if desired, ratios as high as six or more to one may be successfully employed. When mixtures of carboxy compounds or mixtures of alkylene oxides are employed, the ratios will remain approximately the same.

When mixtures of ethylenically unsaturated dicarboxy compounds with nonethylenically unsaturated dicarboxy compounds are used, the resulting increased spacing between unsaturated sites of the polyester due to the inclusion in the polyester chain of dicarboxy units containing no ethylenic unsaturation is responsible for a decreased cross-link density and consequently also a diminution of the desirable physical properties of the cross-linked composition. For this reason, to obtain polyesters having optimum cross-link densities, it is sometimes desirable to alter the ranges of proportions of the dibasic acid or anhydride to alkylene oxide to take into consideration the degree of unsaturation of the mixture of carboxy compounds being employed, as will be apparent to one skilled in the art.

The properties and structure of the polyesters may also be varied by using mixtures of alkylene oxides, such as two or more polyhalogenous alkylene oxides together or a polyhalogenous alkylene oxide with a mono- or nonhalogenous alkylene oxide, thereby to build dissimilar oxyalkylene groups into the oxyalkylene moiety of the polyester. The use of such mixed oxides has the effect of minimizing the crystallinity of the polymer, which generally results in more flexible products when the polyester is further reacted. By controlling the order of addition of these combinations of alkylene oxides, it is moreover possible to tailor the polymer. In this way, for example, it is possible to space the pendant polyhalogenous alkyl groups evenly along the polymer chain.

Alkylene oxides which may be used as coreactants with the polyhalogenous alkylene oxides are vicinal alkylene oxides which are saturated or free of other than aromatic unsaturation. The halogen substituents may be of the type indicated herein for the starting polyhaloalkylene oxide. Examples of such alkylene oxides are ethylene, propylene, 1, 2-butylene, 2,3-butylene, isobutylene oxide, and dodecene oxide, epichlorohydrin, epibromohydrin, styrene oxide, chlorostyrene oxide, methylstyrene oxide, methyl or phenyl glycidyl ether, oleic acid epoxide, and so forth. The preferred maximum number of carbon atoms in any nonpolyhalogenous alkylene oxide is 18.

The amount of such nonpolyhalogenous alkylene oxide which can be employed is limited, and when a nonpolyhalogenous alkylene oxide is employed as a part of the starting alkylene oxide reactant, the percentage of polyhalogeneous alkylene oxide in the total starting alkylene oxide reactant should not be less than about 50% and is preferably at least about 75 to 90% by weight. The nonpolyhalogeneous alkylene oxide starting material, when used, is saturated or devoid of other than aromatic unsaturation and has a hydrogen atom or an alkyl group attached to a carbon of its oxirane ring, said alkyl group having up to two carbon atoms and containing from zero to one halogen atom, inclusive. As already stated, any halogen or combination of halogens may be present in the starting polyhalogenous alkylene oxide, and consequently also in the pendant polyhalogenous lower-alkyl groups built into the polyester. Of the halogens, chlorine, fluorine, and bromine are preferred, and the halogen therefore has an atomic weight of 19 to 80, inclusive.

The primary esterification reaction can be carried out by merely heating and reacting the polyhalogenous alkylene oxide with the starting organic dicarboxy compound, but is preferably conducted in the presence of a reaction catalyst, Friedel-Crafts type catalysts being preferred. These include anhydrous aluminum chloride, antimony pentachloride, stannic chloride, ferric chloride, et cetera, as well as the various halide analogs of the compounds, and their alkoxides. Additional catalysts include boron trifluoride, the formates of zinc, aluminum, and tin, litharge, and so forth. The preferred catalyst depends on the individual reaction, and a catalyst particularly effective for one formulation may be relatively inefficient for another, even for different proportions of the same reactants. For example, aluminum chloride is particularly active in the reaction between 3,3,3-trichloropropylene oxide and maleic anhydride. Stannic chloride and ferric chloride, the latter especially when low ratios of oxide to anhydride are used, are effective catalysts in the polymerization of 3,3-dichloropropylene oxide and maleic anhydride. Of the two, stannic chloride is preferred.

Only small amounts of the more active catalysts such as aluminum chloride and stannic chloride are needed to effect a substantially complete reaction in a short time. For example, only 0.27 percent on a weight basis (or 0.2 mol percent) of freshly sublimed, anhydrous aluminum chloride is sufficient to catalyze the reaction between 3,3,3-trichloropropylene oxide and maleic anhydride. The product obtained in this way has a theoretical ash content of 0.15 percent as aluminum oxide, sufficiently low for most purposes to make salt removal unnecessary. For other catalysts the optimum amount will vary. Satisfactory results are ordinarily obtained with catalyst concentrations of from a few tenths of one percent to one percent or more, based on the total weight of the reactants, depending on the particular catalyst and reactants. If desired, more or less than this amount may be used, even up to a relatively uneconomic ten percent by weight of reactants.

The catalyst may be used in its isolated form, or it may be suspended in a diluent or dissolved in a solvent. It is generally preferred to use a solventless system whenever possible since solvents are frequently difficult to remove from the product, making them economically undesirable, and they may also adversely influence the reaction and tend to discolor the product. The reaction may also be conducted in the absence of catalyst. However this procedure has the disadvantage of low yields and, when strong heating is employed, frequently discolored products, as well as an uneconomically long reaction time, and is therefore not preferred.

The polyesters are generally formed by heating and reacting the polyhalogenous alkylene oxide with the starting ethylenically unsaturated organic dicarboxy compound, as well as other reactants, if any, preferably in the presence of a suitable reaction catalyst, at an elevated temperature ranging from about 75° C. to the reflux temperature of the polyhalogenous alkylene oxide or higher, with a temperature of at least 90°C. being preferred. Normally, the reflux temperature of the reaction mixture, generally from about 150° C. to 170° C. when a solventless system is used, is recommended. When a solvent is employed, the reflux temperature of the mixture may be considerably lower, as for example when toluene is used, and if sufficiently high may be used as the reaction temperature. However, it is normally preferred to use no solvent, since one is generally not needed, and removal of solvent from the product is often economically disadvantageous. When it is desired to use a solvent, nonaqueous or substantially nonaqueous organic solvents and solvents which are unreactive with the reactants and products of the reaction are preferred. These include hydrocarbons such as benzene, toluene, hexane, et cetera; and halohydrocarbons such as halobenzenes, e.g., chlorobenzene, halotoluenes, aliphatic halohydrocarbons such as high boiling polyhalomethanes, et cetera. With low boiling solvents it may be necessary to conduct the reaction under greater than atmospheric pressure, but normally atmospheric pressure is preferred since the use of increased pressure, although operative, sometimes makes control of the exothermic heat of reaction difficult. The reaction may be advantageously conducted under an inert atmosphere, as of nitrogen or carbon dioxide. The use of such an inert atmosphere usually improves the over-all color of the product.

Any of several different general procedures may be used in carrying out the reaction between the starting polyhalogenous alkylene oxide and the ethylenically unsaturated dicarboxy compound. The oxide, dibasic carboxy compound and reaction catalyst, if any, can all be mixed at once and the reaction mixture heated to the desired temperature range. The reaction between the alkylene oxide and dicarboxy compound is exothermic at reaction temperatures so that considerable heat may evolve and maintain the desired temperature for a period without additional external heating, and may even require external cooling. It is possible to take advantage of the exothermic heat of reaction by adding one or more of the reactants to the reaction mixture portionwise, preferably the alkylene oxide, at such a rate that the desired reaction temperature is maintained. Once the initial polymerization stage has been completed, as indicated by the cessation of refluxing when a solventless reaction is conducted at the reflux temperature of the reaction mixture, the reaction mixture is heated for an additional period to drive the reaction to completion and to effect the desired degree of polymerization. In a preferred variation of this general procedure, the dicarboxy compound is initially reacted with the catalyst to form a catalyst-monomer complex which is in turn reacted with the polyhalogenous alkylene oxide. Alternatively, the catalyst-monomer complex is initially esterified with a portion of the polyhalogenous alkylene oxide, and then reacted with the remaining alkylene oxide which is added to the reaction mixture continuously, incrementally, or batchwise. In another variation, only a portion of the ethylenically unsaturated dicarboxy compound or mixture of dicarboxy compounds is initially reacted with the alkylene oxide and then finally the remainder. In addition, combinations of two or more of these approaches and other variations readily apparent to one skilled in the art may be used to carry out the reaction. The procedure may be the same whether one or more polyhalogenous alkylene oxide or mixtures with a nonpolyhalogenous alkylene oxide are employed as starting material, and whether one or more ethylenically unsaturated dicarboxylic compounds or mixtures with non-ethylenically unsaturated dicarboxylic compounds are employed as starting materials.

The catalyst may be added to a mixture of all the reactants at once, or it may be initially reacted or mixed with the dicarboxy compound or mixture of dicarboxy compounds as previously indicated. In general, it has been found disadvantageous to treat the starting alkylene oxide with catalyst at elevated temperatures in the absence of starting dicarboxy compound, since an exothermic reaction usually results, frequently causing severe discoloration and, when the dicarboxy compound is reacted, the resulting polyester is darkly colored and has diminished chemical and physical properties. Our preferred procedure consists in, first, mixing and complexing the catalyst with the dicarboxy compound and then adding the oxide to the catalyst-dicarboxy compound complex.

Although other procedures may be used, the reaction is advantageously carried out in a polymerization or other type reaction kettle fitted with condensing and stirring apparatus, a temperature recording or reading device, and a heat source. To this reaction container is connected a mixing or addition container, fitted in the same way as the polymerization kettle, which permits addition of the reactants to the main polymerization kettel. An inert atmosphere such as carbon dioxide or nitrogen is preferably used, the inert gas being used to dry the equipment as well as minimize color formation due to air oxidation.

In a recommended procedure, the starting dicarboxy compound is charged to the mixing container and heated, and the catalyst then added to form a catalyst-monomer slurry. Generally a slight evolution of heat is observed. The polyhalogenous alkylene oxide is then added with stirring to the catalyst-monomer slurry, and the mixing container heated at a moderate temperature and stirred to maintain the mixture fluid. The polymerization kettle is heated to the desired reaction temperature, and an amount of reaction mixture sufficient to cover the stirring and temperature reading devices is added from the mixing container. Polymerization is preferably carried out at the reflux temperature of the reaction mixture. The remaining reaction mixture is added incrementally to the reaction kettle at such a rate as to maintain the desired temperature of the polymerization mixture. The reaction may be controlled either by controlled addition of the reaction mixture to the reaction zone or by gradual cooling or heating of the reaction kettle to the desired temperature ranges. Upon completion of the initial phase of the polymerization, refluxing ceases. The polymerization mixture is usually heated for an additional period, generally at least 2 hours, in order to bring the reaction to completion and achieve the desired degree of polymerization. The reaction mixture is then stripped of unreacted monomers in conventional manner, as by vacuum distillation, and the recovered monomers directly recycled in the process. If desired, the polyhalogenous ester product may then be mixed directly with other reactants for further modification or storage or may be stored in its isolated form or employed directly in the cross-linking step.

The unsaturated polyesters are nonself-fusible, glassy, solid or semisticky materials. Their color generally ranges from Gardner Color Scale (1953 series) of 9 to 18 and higher, although the color may be further improved by using such modifications as an inert atmosphere, extremely high grades of reactants, variations in catalyst and catalyst concentration, temperature, and so forth. They are soluble in most polar and nonpolar organic solvents, with the notable exception, in most cases, of diethylether and water, as well as in many monomers, including styrene, butyl methacrylate, triallylisocyanurate, diallylphthalate, et cetera. The poyesters have been found to be compatible in nearly any ratio with standard polyester resins. Because of these solubilities, it is frequently convenient to mix the polyester with further reactants and/or standard polyesters with which they are to be reacted or coreacted, and store the resulting mixtures until needed for use. The polyester itself, being nonself-fusible, may be stored in convenient granular, powdered, or viscous but nonself-fusible form.

The molecular weights of the starting unsaturated polyesters range from that of the mono adduct of one dicarboxy compound molecule with one oxide molecule, generally around 275, but depending of course on the individual reactants, to more than 2,500. However, polyesters having molecular weights above 2,000 are frequently excessively viscous for convenient use in further reactions. Those in the 1,000 to 2,000 molecular weight range generally have the most workable viscosities and are therefore ordinarily preferred.

Polymers prepared from maleic anhydride and 3,3,3-trichloropropylene oxide in a molar ratio of about 1:1 to about 1:2, especially in the presence of aluminum chloride catalyst, and polymers of maleic anhydride and 3,3-dichloropropylene oxide in a molar ratio of about 1:1 to about 1:2, especially in the presence of stannic chloride catalyst, give cross-linked products of particular interest and value and therefore represent preferred starting polyesters according to the invention. These are preferably cross-linked with about 20–50% by weight of styrene, as more fully disclosed hereinafter.

CROSS-LINKAGE

As already stated, the cross-linked polyesters of the present invention are prepared by cross-linking an ethylenically unsaturated polyhalogenous polyester with an ethylenically unsaturated cross-linking agent. The conditions are, in general, conventional for the cross-linking of any unsaturated polymer with an unsaturated cross-linking agent. The ethylenically unsaturated cross-linking agents which may be employed are materials containing at least one reactable ethylenically unsaturated group. These materials include polymerizable ethylenically unsaturated monomers such as styrene, vinyltoluene, alpha-methy styrene, chlorostyrene, fluorostyrene, trifluoromethylstyrene, dichlorostyrene, divinylbenzene, butadiene, diallylphthalate, triallylisocyanurate, acrylic acid, the akyl acrylates and methacrylates, including methyl methacrylate, ethylmethacrylate butyl methacrylate, etc., lower-alkyl esters of maleic and fumaric acid, acrylonitrile, vinylidene cyanide, vinyl pyridine, vinyl pyrrolidone, vinyl carbazole, vinyl ketones such as vinyl butyl ketone, etc., drying oils including linseed oil, perilla oil, poppy oil, etc., and so forth, as well as polymeric ethylenically unsaturated cross-linking agents such as for example natural and synthetic rubbers, e.g., the isoprene rubbers, butadiene rubbers, styrene-butadiene rubbers, vinyl polymers, etc., and the like. The cross-linking agent selected in a particular instance depends on numerous factors such as, among others, the properties desired in the final product, the cost and availability of the cross-linking agent, and the properties (especially degree of unsaturation) of the cross-linking agent itself, and for different applications different cross-linking agents may be chosen, although in every case those capable of free-radical initiation are preferred. Obviously, a wide latitude is possible in selection of the cross-linking agent, and it may even involve the use of combinations of two or more cross-linking agents. By way of example, styrene is frequently used due to its favorable cost, compatibility and reactivity, as well as the excellent physical properties it provides in the final cross-linked product. However, by including a small amount of a different cross-linking agent, for example, an alkyl methacrylate, e.g., butyl methacrylate, the weathering characteristics and optical properties of the plastic may be improved. By cross-linking the polyester with a compound which is more highly functional than styrene, such as diallylphthalate, divinylbenzene, or triallylisocyanurate, many of the physical and chemical properties of the plastic can be improved, for example, resistance to embrittlement and creasing in organic solvents such as acetone or ethylene dichloride, heat resistance, and so forth. Generally, the greater the functionality of the cross-linking agent, the greater the chemical and heat resistance of the cross-linked polymer.

The amount of cross-linking agent used in cross-linking the starting polyhalogenous unsaturated polyester to prepare the compositions of the present invention depends to a considerable extent on the particular cross-liking agent and polyester employed, as well as the chemical and physical properties desired in the final product. The amount used can vary over a considerable range. As little as 20% of cross-linking agent by weight of the polyester can be used to prepare a hard, durable plastic having a high resistance to combustion. On the other hand, by increasing the amount of cross-linking agent to as much as 40–50% by weight, plastics can be obtained which are more flexible and less hard. In general, the greater the proportion of cross-linking agent, the less hard and more flexible the product. The usual amount of cross-linking agent is about 30–40% by weight but, if desired, more or less may be used, and even excesses of cross-linking agent over polyester. The optimum amount of cross-linking agent depends upon the characteristics desired in the product. Preferred ranges are ordinarily about 10 to about 50% by weight and usually between about 30 and 40% by weight of polyester.

The cross-linking agents generally exhibit good compatibiilty with the ethylenically unsaturated polyhalogenous polyesters, and therefore may ordinarily be mixed with the starting polyester with or without the aid of plasticizers and at any time prior to the final cross-linking reaction step. The polyester may, for example, be mixed with the desired cross-linking agent to give a polyester resin and cross-linking agent mixture which is nonselffusible and which can be stored until use and shipped in any convenient form, such as solid, granular, or powder form, and in any convenient quantity. Or, the cross-linking agent (or additional cross-linking agent) may be mixed with the polyester at any other time prior to the actual step of cross-linking. Cross-linkage is simply effected by exposing the mixture of the polyester and cross-linking agent to favorable reaction conditions. These conditions involve the use of a vinyl polymerization initiator, preferably a chemical initiator of the free-radical type. Any established vinyl polymerization initiator may be employed. Examples of these polymerization initiators are the peroxides, representatively benzoyl peroxide, methylethylketone peroxide, acetyl peroxide, hexachloroacetyl peroxide, succinic acid peroxide, di-tertiary-butyl peroxide, di-tertiary-butyl hydroperoxide, cumene hydroperoxide, alpha,alpha'-azo-di-isobutyronitrile, etc. Other initiators which may be used to initiate the cross-linking include heat, electromagnetic radiation, dielectric heating, irradiation and so forth, as well as combinations thereof and combinations with chemical initiators. The primary consideration in selecting a polymerization initiator is the temperature at which the cross-linking or curing process is desired to be carried out and the rate necessary to achieve a satisfactory gelled system. As usual, under the same reaction conditions some initiators will effect complete reaction while others will effect a relatively incomplete reaction. Selection of the particular reaction initiator will of course be made with these factors in mind, as well as the characteristics desired in the final product.

The optimum time and temperature for curing of a particular polyester-cross-linking agent composition depends on various factors, in addition to the reactants employed in preparation of the polyester and cross-linking of the same. The strength and many other of the chemical and physical properties of the cross-linked resin depend on the degree of cure and the temperature at which the cure is effected and, for a given resin cured at a specific temperature, the tensile strength of the final product appears to increase with the degree of cure. Ordinarily, temperatures of about 60° C. are satisfactory, although higher or lower temperature ranges can be used if desired. Lower temperatures generally require a longer curing time for a given degree of cure, while higher temperatures require a shorter time. Of course, the length of the treatment is governed by the degree of cure desired. Generally, 6 to 20 hours is sufficient to effect a normal cure, although a shorter or longer period may be used, as in special cases with certain extremely active initiators or accelerators, in which case the curing period for the particular system can be considerably shortened. For purposes of shortening the cure or permitting a lower curing temperature, it is preferred to employ an accelerator in addition ot the cross-linking initiator. For example, dimethylaniline, cobalt naphthenate or oleate, or similar accelerators are commonly employed for such purposes. It is sometimes also desirable to vary conditions during the cure, as for example by curing at one temperature followed by a post cure at the same or a different temperature.

It is also within the contemplation of the present invention to use more than one unsaturated polyhalogenous polyester, or to supplement the described starting polyhalogenous polyesters with other polyesters, such as standard commercially available polyester. These additional polyesters also contain ethylenic unsaturation. Such polyesters include standard halogenous or nonhalogenous polyesters based on maleic or fumaric acids or anhydrides, as well as those based on other ethylenically unsaturated polybasic acids or anhydrides, and polyesters prepared from mixtures of ethylenically unsaturated acids or anhydrides with acids or anhydrides free from other than aromatic unsaturation, such as phthalic acid, hexachloroendomethylene tetrahydrophthalic acid, adipic acid, and so forth. These and other polyesters are known in the art and may be obtained commercially, or be prepared by any of the standard procedures for preparing such polyesters. In order to obtain satisfactory fire-resistant properties in the cross-linked product, it is recommended that nonhalogenous polyesters not exceed 25 percent by weight of the mixture of the polyesters. The polyesters are compatible before the cross-linking step and the procedure employed is to admix the starting polyesters, when more than one is used, and then cross-link the mixture. When nonhalogenous polyesters are used in the admixture, polyesters corresponding to the presently disclosed novel polyhalogenous unsaturated noncross-linked polyesters, except having no halogen, are preferred.

The properties of the cross-linked polyester can also be varied by incorporating plasticizers into the composition either chemically or physically. These plasticizers include, among others, polyfunctional compounds capable of reacting with free hydroxy or carboxy groups of the polyester, as well as vinyl plasticizers, such as dioctyl phthalate, octyl cresyl phosphate, dibutyl phthalate, other alkyl and alkoxyalkyl ethers of dicarboxylic acids, saturated polyesters, et cetera. The resins of this invention can also be modified by the addition of pigments, fillers, stabilizers, lubricants, etc., without detracting from the benefits of the invention.

It is possible to improve the over-all color of the plastic by adding a small amount of an antioxidant during some stage of its preparation, advantageously the final cross-linking stage. Many such agents are known, such as cadmium and barium soaps, tin compounds such as the octanoate, et cetera. Of the antioxidants the phosphites are preferred, representative examples being dimethyl phosphite and triphenyl phosphite. In addition to improving the color of the finished product, the phosphites often impart further fireproofing characteristics to the system.

The cross-linked resins of the present invention are prepared by mixing the polyester and cross-linking agent and casting, molding or applying the mixture in some convenient manner to a mold, form, or surface, etc., and curing the mixture, generally by adding a chemical vinyl polymerization initiator and heating the mixture until the desired degree of curve is achieved. The resulting products have a wide variety of properties, as discussed hereinbefore, and are characterized by an order of non-flammability superior to that of presently known cross-linked polyester resins. They have chemical resistance comparable and even superior to that of standard polyester plastic presently available. In addition, the cross-linked polyester compositions generally have favorable moisture absorption properties.

The cross-linked polyester resins of the invention may be advantageously utilized as elastomers in such diversified fields as shoes, rubber tires, gears and gaskets, elastic threads, elastomer-coated fabrics, adhesives, as well as many others. They may be used to prepare tough, flexible to rigid thermosetting coatings. One preferred class of such coatings is prepared using a drying oil such as linseed, perilla, or poppy oil, etc., as cross-linking agent. Such coatings are prepared by mixing the polyhalogenous polyester and drying oil and applying the resulting mixture to a surface, such as by dipping, brushing, knife coating, roller coating, spraying, etc., and heating the resulting film at an elevated temperature for a time sufficient to cure the film and produce a tough resistant coating which exhibits good fire and chemical resistance. Alternatively, the film may be allowed to air-dry or otherwise caused to undergo oxidative cross-linking to give tough, elastic, wheather and chemical resistant films having improved fire resistance.

Hard polyester plastics can also be prepared according to the present invention, and are especially useful where plastics having improved fire resistance are of interest. These plastics can be used alone, or they can be reinforced with strands or fibers of synthetic or natural materials including glass fibers, nylon, cotton, sisal, asbestos, cellulose, as well as many others, in any convenient form such as fabric, mats, yarn, chopped or continuous roving form, etc. Some strength increase can also be achieved by using certain nonfibrous materials such as carbon, wood and pigment fillers, and so forth. Such reinforcing material can be included in the composition in any convenient manner, such as by mixing the composition with the reinforcing material or vice versa, prior to, at the same time, or after applying the resin mixture to the desired mold, form, or surface, etc., or the resin mixture may be applied directly to the reinforcing material, as when fabrics, sheets, or mats are being used. The resin mixture and reinforcing material may also be combined in situ and cured. Such procedures and techniques known and used in the art and which typify these and other possible variations include hand lay-ups, spray-ups, preforms, premixes, prepegs, and filament winding, as well as numerous others. Such reinforced or filled resins, as well as the resins without reinforcing materials, are useful in a variety of construction, structural, and manufacturing applications wherein strong durable plastics can be employed, as for example resin-rigidized substrates, laminates, filled and unfilled plastics, in situ cured plastics, etc., and including applications where similar cross-linked polyester resins are now being used, and especially where increased fire resistance and/or chemical resistance of the compositions of the invention are of value. Innumerable other uses and applications of the cross-linked compositions of the present invention exist, and will be readily appreciated by one skilled in the art. The preferred halogen content by weight in the cross-linked polyesters of the invention is between about 12 and 38%, and especially between about 20 and 35%.

TEST PROCEDURES

Several general procedures can be used in testing the polyester products of the present invention. Burning tests are made by exposing a sample of the cross-linked polyester plastic having a standard size and shape directly to a Bunsen burner flame. If the plastic does not burn under these test conditions it is termed "nonburning." If some burning does occur, the product is considered to "burn."

The hardness of the cast polyester is determined by using a Barcol impressor, manufactured by Barber-Colman, Rockford, Illinois, a portable spring-loaded instrument originally designed to distinguish various alloys of aluminum. The indenter is a truncated cone with a 26 degree angle and a flat tip 0.0062 inch in diameter. The scale reads from 0 to 100 direct hardness.

The tensile properties, including yield stress, tensile strength, and elongation at break, are determined by ASTM D–638 test procedure and are measured on the "Instron," manufactured by Instron Engineering Corporation. A sample 8.5 inches by 0.5 inch by less than 0.25 inch is pulled at a very slow rate until the sample ruptures. The force in pounds per square inch required to break the sample is measured, as well as length of sample, etc.

The flexual properties are determined by ASTM D–790 test procedure, which involves bending a standard bar of the plastic, having a rectangular cross-section and supported at both ends in the manner of a simple beam, by applying a load at its midpoint. The sample is deflected until rupture occurs or until the maximum fiber strain of five percent is reached. The flexual modules can be measured by drawing a line tangent to the slope of the stress-strain curve at the origin.

Water absorption is determined by ASTM D–570 test procedure and is the percent water absorbed by a three inches by one inch by less than 0.25 inch sample during the duration of the test. The increase in weight is measured and expressed as a percentage.

The heat distortion test, ASTM D–648–56, determines the temperature at which an arbitrary deformation occurs when the specimen is subjected to an arbitrary set of test conditions. A bar (0.5 by 0.5 by 5 inches) of test material is subjected to a load of 264 p.s.i. and the temperature is increased at the rate of 2° C. per minute. The temperature at which the bar has deflected 0.010 inch is reported as the heat distortion temperature. Mineral oil is the usual immersion liquid.

The product of the invention is accordingly a cross-linked polyester resin which is the reaction product of
  (I) an ethylenically unsaturated polyester of
    (1) a dicarboxylic organic material selected from the group consisting of
      (a) ethylenically unsaturated dicarboxylic acid anhydrides and
      (b) ethylenically unsaturated dicarboxylic acids, (c) any of the foregoing together with a member of the group consisting of saturated dicarboxylic acid anhydrides and acids and dicarboxylic acids and anhydrides free of other than aromatic unsaturation, the total amount of ethylenically unsaturated dicarcarboxylic material as defined in (a) and (b) being present in amount of at least about 40% by weight of the total amount of dicarboxylic material as defined in (c), and (2) a vicinal alkylene oxide selected from the group consisting of
(a') a vicinal alkylene oxide containing from three to four carbon atoms, inclusive, and having an alkyl group attached to a carbon atom of the oxirane ring, said alkyl group having up to two carbon atoms and containing at least two halogen atoms, each halogen having an atomic weight of 19 to 80, inclusive, and
(b') an alkylene oxide as defined in (a') together with a vicinal alkylene oxide, selected from the group consisting of saturated alkylene oxides and alkylene oxides which are free from other than aromatic unsaturation, having as a substituent attached to a carbon atom of the oxirane ring a member of the group consisting of hydrogen and an alkyl group, said alkyl group having up to two carbon atoms inclusive and containing from zero to one halogen atom, inclusive, any halogen having an atomic weight of 19 to 80, inclusive, said alkylene oxide as defined in (a') being present in amount of at least about 50% by weight of the total amount of alkylene oxide as defined in (b'), said polyester being characterized by the presence of pendant haloalkyl groups which have up to two carbon atoms and which contain at least two halogen atoms, and (II) an ethylenically unsaturated cross-linking agent, said cross-linked polyester being characterized by the presence of haloalkyl groups which have up to two carbon atoms and which contain at least two halogen atoms, and by relatively high order of nonflammability and chemical resistance.

The process of the invention is accordingly a process for preparing a cross-linked polyester resin comprising reacting
(I) an ethylenically unsaturated polyester of
(1) a dicarboxylic organic material selected from the group consisting of
(a) ethylenically unsaturated dicarboxylic acid anhydrides and
(b) ethylenically unsaturated dicarboxylic acids,
(c) any of the foregoing together with a member of the group consisting of saturated dicarboxylic acids and anhydrides and dicarboxylic acids and anhydrides free of other than aromatic unsaturation, the total amount of ethylenically unsaturated dicarboxylic material as defined in (a) and (b) being present in amount of at least about 40% by weight of the total amount of dicarboxylic material as defined in (c), and
(2) a vicinal alkylene oxide, selected from the group consisting of
(a') a vicinal alkylene oxide containing from three to four carbon atoms, inclusive, and having an alkyl group attached to a carbon atom of the oxirane ring, said alkyl group having up to two carbon atoms and containing at least two halogen atoms, each halogen having an atomic weight of 19 to 80, inclusive, and
(b') an alkylene oxide as defined in (a') together with a vicinal alkylene oxide, selected from the group consisting of saturated alkylene oxides and alkylene oxides which are free from other than aromatic unsaturation, having as a substituent attached to a carbon atom of the oxirane ring a member of the group consisting of hydrogen and an alkyl group, said alkyl group having up to two carbon atoms and containing from zero to one halogen atom, inclusive, any halogen having an atomic weight of 19 to 80, inclusive, said alkylene oxide as defined in (a') being present in amount of at least about 50% by weight of the total amount of alkylene oxide as defined in (b'), and (II) an ethylenically unsaturated cross-linking agent, in the presence of a vinyl polymerization initiator.

As already pointed out, up to about 25% by weight of total polyester reactant may be made up by an ethylenically unsaturated polyester (Ia), which is devoid of pendant polyhaloalkyl groups, in addition to the ethylenically unsaturated polyester (I), and both of these ethylenically unsaturated polyesters (I) and (Ia) will be integraly co-crosslinked with the cross-linking agent during the reaction to make up a composite cross-linked polyester product having improved properties as compared with the standard polyester (Ia) cross-linked alone. The ethylenically unsaturated polyester (Ia) will preferably be as inexpensive as practical and will therefore ordinarily be nonhalogenous, although any commercially available cross-linkable ethylenically unsaturated polyester including halogenous and even highly halogenous polyesters may be employed as polyester (Ia) within the limits of economic feasibility.

The following examples are given by way of illustration only and are not to be construed as limiting. The molar ratio of reactants for the polyester of the invention is given in the heading for each example and the position of the numbers corresponds to the position of the reactants mentioned in the example heading.

*Example 1.—Styrene cross-linked plastic from a maleic anhydride-trichloropropylene oxide (1:2 molar ratio) polyester*

A polychloroalkyl ester resin was initially prepared from 3,3,3-trichloropropylene oxide and maleic anhydride. The equipment used in this preparation consisted of a three-litter jacketed resin kettle, equipped with an upright condenser, stirrer and thermometer, and heated by circulating hot ethylene glycol. A one-liter round bottom flask, equipped with a heating mantle, stirrer, thermometer and condenser, was connected to the resin kettle, permitting incremental addition of reactants.

The resin kettle was cleaned, dried, purged with nitrogen, and heated to 160° C. To the round-bottom flask containing 196.2 grams (2 mols) of melted maleic anhydride were added 2 grams (0.015 mol) of freshly sublimed aluminum chloride. A slight evolution of heat amounting to 5–10° C. was realized as the maleic anhydride-aluminum chloride complex was formed. To this slurry was added 432.7 milliliters (4 mols) of 3,3,3-trichloropropylene oxide and the mixture was thereafter heated and maintained at a temperature between 80–90° C.

When the resin kettle had been heated to about 160° C. approximately 200 ml. of the slurry was transferred from the round-bottom flask to the resin kettle by use of nitrogen pressure. The trichloropropylene oxide began to reflux at about 150° C. The remainder of the mixture was added incrementally, maintaining a gentle reflux. At the end of 60 minutes, all reactants had been added and the initial phase of the polymerization was complete. The mixture was then heated at 150° C. for 1 additional hour followed by vacuum stripping of unreacted monomers.

A quantity of the polychloroalkyl ester resin (240 grams) was mixed with 160 grams of styrene to give a mixture containing 40% styrene. 2 grams (0.5%) of benzoyl peroxide and 4 ml. (1%) of dimethylphosphite were added and a plate was cast. Cure was effected by heating at 60° C. for 16 hours followed by a post cure at 100° C. for 6 hours. The product was nonburning and clear and transparent and golden tan brown in color.

*Example 2.—Styrene, butyl methacrylate cross-linked plastic from a maleic anhydride-trichloropropylene oxide (1:2 molar ratio) polyester*

To 287 grams of a solution containing 78% polychloroalkyl ester resin as prepared in Example 1 (maleic anhydride and 3,3,3-trichloropropylene oxide in a 1 to 2 molar ratio) and 22% styrene, were added an additional 46 grams of styrene, 18 grams of butyl methacrylate, 1.75 grams of benzoyl peroxide and 3.5 ml. of dimethylphosphite. The resulting mixture was cured for 2 days at 60° C. in a circulating air oven.

*Example 3.—Triallylisocyanurate cross-linked plastic from a maleic anhydride-trichloropropylene oxide (1:2 molar ratio) polyester*

A quantity (240 grams) of the polychloroalkyl ester prepared as in Example 1 (maleic anhydride and 3,3,3-trichloropropylene oxide in a 1 to 2 molar ratio) was dissolved at 100° C. in 160 grams of triallylisocyanurate. The solution was cooled to 75° C. and 4 grams (1%) of benzoyl peroxide was added. The mixture was then stirred until a clear solution was obtained. A plate and several 15 by 175 millimeter slugs were cast and cured at 60° C. for 30 hours. The product was nonburning.

*Example 4.—Diallylphthalate cross-linked plastic from a maleic anhydride-trichloropropylene oxide (1:2 molar ratio) polyester*

Example 3 was repeated using 160 grams of diallylphthalate in place of the 160 grams of triallylisocyanurate. The product was nonburning.

*Example 5.—Vinyl toluene cross-linked plastic from a maleic anhydride-trichloropropylene oxide (1:2 molar ratio) polyester*

Example 3 was repeated using 160 grams of vinyl toluene in place of the 160 grams of triallylisocyanurate. The product was nonburning.

The physical properties of the plastics prepared in Examples 1 through 5 are tabulated in Table I below. In each case the polyester was prepared using a 1 to 2 molar ratio of maleic anhydride and 3,3,3-trichloropropylene oxide.

*Example 6.—Butyl methacrylate cross-linked plastic from a maleic anhydride-trichloropropylene oxide (1:2 molar ratio) polyester*

Example 3 was repeated using 160 grams of butyl methacrylate in place of the 160 grams of triallylisocyanurate. The product was nonburning and had a specific gravity of 1.340, a flexural yield modulus of 1,025 pounds per square inch, a tensile strength of 3,475 p.s.i., and water absorption of 0.06% in 24 hours at room temperature.

*Example 7.—Styrene cross-linked plastic from a maleic anhydride-trichloropropylene oxide (1:3 molar ratio) polyester*

A polyester was initially prepared by reacting maleic anhydride with 3,3,3-trichloropropylene oxide in a molar ratio of 1 to 3. To effect this preparation, a catalyst complex was first prepared by reacting 196.2 grams (2 mols) of maleic anhydride and 4 grams (0.03 mol) of freshly sublimed anhydrous aluminum chloride at about 90° C. To this slurry 484 grams (3 mols) of 3,3,3-trichloropropylene oxide were added and the mixture then heated to about 160° C. at which temperature polymerization initiated. After approximately 15 minutes an additional 484 grams (3 mols) of 3,3,3-trichloropropylene oxide was added and the reaction mixture heated to 160° C. for a total polymerization time of 19 hours. The reaction mixture was vacuum stripped to remove any unreacted monomer and then cooled. The yield of the isolated product was 1004 grams for an 87% conversion. The product had a molecular weight of 1300 as determined by boiling point elevation.

A mixture containing 60% of the polychloroalkyl ester and 40% styrene was heat cured using 1% of benzoyl peroxide as catalyst. The plastic product had a specific gravity of 1.348, a Barcol hardness of 38, tensile strength of 4,694 pounds per square inch, flexural strength of 10,009 pounds per square inch, and water absorption at room temperature (24 hours) of 0.04%. The product was nonburning.

*Example 8.—Styrene cross-linked plastic from a maleic anhydride-trichloropropylene oxide (1:1 molar ratio) polyester*

In a one-liter round-bottom flask equipped with a thermometer, condenser and mechanical stirrer, 196 grams (2 mols) of maleic anhydride were melted and reacted with 1.3 grams (0.01 mol, 0.25 mol percent of freshly sublimed aluminum chloride to form a catalyst-monomer complex. To this slurry 323 grams (2 mols) of 3,3,3-trichloropropylene oxide were added and the resulting mixture was heated to 150° C., at which temperature the oxide began to reflux and polymerization initiated. An exothermic heat of reaction of approximately 50° C. was observed, the over-all polymerization requiring about 20 minutes. No unreacted monomer could be removed by application of vacuum stripping at 150° C. at 0.5 millimeters of mercury pressure. The

TABLE I

| Example | 1 | 2 | 3 | 4 | 5 |
|---|---|---|---|---|---|
| Cross-linking monomer | 40% Styrene | 35% Styrene +5% Butyl Methacrylate | 40% Diallylphthalate | 40% Triallylisocyanurate | 40% Vinyl Toluene |
| Specific Gravity | 1.334 | 1.337 | 1.47 | 1.48 | 1.32 |
| Barcol Hardness | 35-37 | 34 | 49 | 56 | 32 |
| Tensile Strength, p.s.i | 7,458 | 7,219 | 3,247 | 2,373 | 4,663 |
| Water Adsorption, Percent: | | | | | |
| 24 hrs. at RT | 0.0093 | 0.105 | 0.076 | 0.106 | 0.062 |
| 4 hrs. at 100° C | 0.29 | | | | |
| Flexural Strength, p.s.i | 12,677 | 15,290 | | | |
| Heat Distortion, ° C | 112 | 72 | 146 | 164 | 83 |
| Percent Chlorine | ca. 28 | ca. 28 | ca. 28 | ca. 28 | ca. 28 |
| Flammability | NB | NB | NB | NB | NB |

NB=Nonburning.

dark, viscous polychloroalkyl ester reaction product was cooled to 100° C. and 279 grams of styrene containing 0.1% hydroquinone was mixed thereinto. The resulting mixture containing 40% styrene was then cured by heating. The resulting plastic product was nonburning.

*Example 9.—Styrene cross-linked plastic from a maleic anhydride-dichloropropylene oxide (1:3 molar ratio) polyester*

In a one-liter round-bottom flask equipped with a thermometer, condenser and mechanical stirrer, 127 grams (1 mol) of 3,3-dichloropropylene oxide, 33 grams (0.33 mol) of maleic anhydride and 1.2 ml. (0.01 mol) of stannic chloride were mixed in 500 ml. of toluene diluent and the resulting solution then refluxed for approximately 15 hours. After this time the toluene was removed under vacuum leaving 144 grams of polychloroalkyl ester product, corresponding to a 90% conversion.

The polychloroalkyl ester was blended with 96 grams of styrene and 4.8 ml. of 60% methyl ethyl ketone peroxide, and the resulting mixture cured at room temperature for 18 hours, followed by a 6-hour cure at 100° C. The product was nonburning and had a tensile strength of 3,876 pounds per square inch and a water absorption of 0.620% in 4 hours at 100° C. (The latter figure compares favorably with standard commercial polyesters, which show 3-4% water absorption by this test.)

*Example 10.—Styrene cross-linked plastic from a maleic anhydride-dichloropropylene oxide (1:2 molar ratio) polyester*

To a mixture of 508 grams (4 mols) of 3,3-dichloropropylene oxide and 196 grams (2 mols) of maleic anhydride were added 4.8 ml. (0.04 mol) of anhydrous tin tetrachloride. The reaction mixture was initially cooled to prevent overheating and was then maintained at a temperature of 100° C. to 120° C. for 5 hours. The reaction mixture was then vacuum stripped of unreacted monomers. The resulting polychloroalkyl ester product had a molecular weight of about 1400 and a chlorine content of 42%.

A quantity (120 grams) of the above-prepared resin was dissolved with slight heating in 80 grams of redistilled styrene. After cooling the mixture to room temperature, 4 ml. of 60% methyl ethyl ketone peroxide in dimethylphthalate (Lupersol DDM) was added and an ASTM standard casting made and allowed to cure overnight at room temperature followed by a 6-hour cure at 100° C. in an air circulating oven. The product was a clear, nonburning, polyester-based plastic having a chlorine content of 29%, specific gravity of 1.326, an average Barcol Impressor hardness of 35, tensile strength of 4,076 pounds per square inch, and a flexural strength of 7,915 pounds per square inch.

*Example 11.—Styrene cross-linked plastic from a maleic anhydride-dichloropropylene oxide (1:2 molar ratio) polyester*

A mixture containing 70 parts of the polyester prepared in Example 10 (maleic anhydride and 3,3-dichloropropylene oxide in a 1 to 2 molar ratio) and 30 parts of styrene was heat cured using methyl ethyl ketone peroxide as catalyst. The produce was nonburning and had a specific gravity of 1.38, Barcol hardness of 38 to 40, tensile strength of 5,426 pounds per square inch, flexural strength of 12,692, and a water absorption at room temperature (24 hours) of 0.093%.

*Example 12.—Styrene cross-linked plastic from a maleic anhydride-dichloropropylene oxide (1:1 molar ratio) polyester*

In a one-liter round-bottom flask equipped with a thermometer, a condenser and mechanical stirrer, 127 grams (1 mol) of 3,3-dichloropropylene oxide, 98 grams (1 mol) of maleic anhydride, and 1 milligram of anhydrous ferric chloride were mixed in 400 ml. of toluene solvent, and the mixture heated until the solvent refluxed. After 2 hours reaction had ceased and the toluene was stripped off under vacuum after being filtered through a Celite diatomaceous earth filter bed. The polychloroalkyl ester material was obtained in 95% yield and had a molecular weight of 1700 as determined by boiling point elevation technique.

60 parts of the foregoing polyester were then blended with 40 parts of styrene and the resulting mixture cured using methyl ethyl ketone peroxide as catalyst. The product was a nonburning plastic having a specific gravity of 1.314, Barcol hardness of 29 to 30, tensil strength of 5,033 pounds per square inch, flexural strength of 4,996 pounds per square inch, and a water absorption of 0.0857% at room temperature (24 hours) and 0.261% at 100° C. (4 hours).

*Example 13.—Styrene cross-linked plastic from a maleic anhydride-trichloropropylene oxide - dichloropropylene oxide (1:1:1 molar ratio) polyester*

A catalyst-monomer complex was prepared by reacting 3 grams (0.0225 mol) of sublimed aluminum chloride with 196.2 grams (2 mols) of maleic anhydride at 70° C. to 80° C. and 322.8 grams (2 mols) of 3,3,3-trichloropropylene oxide and 254.0 grams (2 mols) of 3,3-dichloropropylene oxide then added thereto. The mixture was heated to 150–155° C. for 1 hour after which unreacted monomer was removed by vacuum stripping. A gas chromatogram of the unreacted polyhalopropylene oxide showed two pronounced equal peaks, one for the dichloropropylene oxide and the other for the trichloropropylene oxide, and showed that both oxides had reacted with a maleic anhydride to form a terpolymer.

To this polychloroalkyl ester were added 400 grams of styrene, 4 ml. of dimethylphosphite and 2 grams of benzoyl peroxide. The 40% styrene solution so obtained was cured for 18 hours at 60° C. followed by a second cure at 100° C. for 6 hours. The nonburning product had the following physical properties: specific gravity, 1.349; Barcol hardness, 44; tensile strength 6,830 pounds per square inch; flexural strength, 15,763 pounds per square inch; water absorption in 4 hours at 100° C., 0.113%.

*Example 14.—Styrene cross-linked plastic from a maleic anhydride-trichloropropylene oxide - propylene oxide 1:2:1 molar ratio) polyester*

A terpolymer of maleic anhydride, 3,3,3-trichloropropylene oxide, and propylene oxide was initially prepared. In a one-liter round-bottom flask equipped with a stirrer, condenser, addition funnel and temperature recorder, 98.1 grams (1 mol) of maleic anhydride and 322.8 grams (2 mols) of 3,3,3,-trichloropropylene oxide were mixed and heated to 135° C., at which temperature 1 gram of sublimed aluminum chloride dissolved in 10 ml. of anhydrous diethylether was introduced. The polymerization mixture was maintained at a temperature between 150 and 170° C. for approximately 40 mintues, after which time approximately 35 ml. of propylene oxide were added dropwise over the course of 70 minutes. Unreacted monomer was removed by vacuum stripping for 5 minutes at 1 millimeter of mercury pressure. Vapor phase chromatogram of liquid removed by vacuum stripping indicated the presence of a small amount of propylene oxide and of trichoropropylene oxide, and showed that a terpolymer was formed.

The polymer mixture was cooled to about 100° C. and 258 grams of styrene containing 0.5 milligram of hydroquinone were added. The polychloroalkyl ester resin was cast into films and cured using as catalyst methyl ethyl ketone peroxide and cobalt naphthenate. The resulting product was nonburning.

Example 15.—Styrene cross-linked plastic from a maleic anhydride-dichloropropylene oxide (1:2 molar ratio) polyester A polyester was initially prepared from maleic anhydride and 3-bromo-3,3-dichloropropylene oxide. In a 250-ml. round-bottom flask equipped with a mechanical stirrer, thermometer and water-cooled condenser, 0.2 gram of freshly sublimed anhydrous aluminum chloride was added at about 70° C. to 19.6 grams (0.2 mol) of maleic anhydride. After 5 minutes 82.4 grams (0.4 mol) of 3-bromo-3,3-dichloropropylene oxide were added and the mixture heated to about 160° C., at which temperature there was an exothermic evolution of heat which amounted to 30° C. The reaction mixture was maintained with heating at a temperature between 150° C. and 156° C. for approximately 5 hours, at which time unreacted monomer was removed by vacuum stripping at 1 millimeter of mercury pressure.

A mixture containing 60% of the foregoing polyhaloalkyl ester and 40% styrene was cured using 1% of benzoyl peroxide as catalyst. The product was nonburning and had a specific gravity of 1.56 and a Barcol hardness of 41.

Example 16.—Styrene cross-linked plastic from a maleic anhydride-trichlorobutylene oxide (1:2 molar ratio) polyester A polyester was initially prepared from maleic anhydride and 1,1,1-trichloro-3,4-epoxybutane. In a 500-ml. round-bottom flask equipped with a mechanical stirrer, condenser and thermometer, 1 gram of freshly sublimed anhydrous aluminum chloride was reacted at 90° C. with 98.1 grams (1 mol) of maleic anhydride to form a catalyst complex. To this slurry 350.8 grams (2 mols) of 1,1,1-trichloro-3,4-epoxybutane was added and the mixture maintained at a temperature between 160 and 180° C. for 3.75 hours, after which time unreacted monomer was removed by vacuum stripping and the product cooled. The product had a molecular weight of 1037 as determined by boiling point elevation.

A mixture containing 60% polyester and 40% styrene as the cross-linking monomer was cured to produce a nonburning plastic using 1% of benzoyl peroxide as catalyst.

The physical properties of the plastics prepared in Examples 1, 15 and 16 are summarized in Table II. In each case the plastic was prepared from a polyester obtained by reacting the trihaloalkylene oxide with maleic anhydride in a molar ratio of 2 to 1.

TABLE II

| Example | 1 | 15 | 16 |
| --- | --- | --- | --- |
| Alkylene oxide | 3,3,3-trichloropropylene oxide | 3-bromo-3,3-dichloropropylene oxide | 1,1,1-trichloro-3,4-epoxybutane |
| Specific Gravity | 1.334 | 1.56 | 1.32 |
| Barcol Hardness | 35–37 | 41 | 27 |
| Water Absorption, Percent: 24 hours at R.T. | 0.0093 | 0.050 | 0.093 |
| Tensile Strength, p.s.i. | 7,458 | Brittle | 4,492 |
| Heat Distortion, ° C. | 112 | 60 | 62 |
| Percent Halogen | ca. 28 | ca. 35 | ca. 26 |
| Flammability | NB | NB | NB |

NB = Nonburning.

Example 17.—Styrene cross-linked plastic from a fumaric acid-trichloropropylene oxide (1:2 molar ratio) polyester Into a 300-ml. round-bottom flask equipped with a mechanical stirrer, thermometer and water-cooled condenser, 23.2 grams (0.2 mol) of fumaric acid, 64.4 grams (0.4 mol) of 3,3,3-trichloropropylene oxide, and about 0.2 gram of freshly sublimed anhydrous aluminum chloride were charged and the mixture slowly heated. The trichloropropylene oxide started to reflux at approximately 154° C., at which temperature the fumaric acid began to dissolve. The temperature was maintained between 160 and 190° C. for 240 minutes, during which time the fumaric acid went completely into solution. Water of reaction was also observed. The reaction mixture was stripped for 5 minutes at 1 millimeter of mercury pressure, leaving 87 grams of product, corresponding to a 100% yield.

A 40% styrene solution of the foregoing polyester was prepared by adding 58 grams of styrene to the polyester. The base resin was cured by adding 0.75 gram of benzoyl peroxide and 1.5 ml. of dimethyl phosphite, and heating at 60° C. for 15 hours followed by a post cure at 100° C. for 6 hours. A cloudy, tan plastic which was nonburning was obtained.

Example 18.—Styrene cross-linked plastic from an itaconic acid-dichloropropylene oxide (1:2 molar ratio) polyester In a one-liter round-bottom flask equipped with mechanical stirrer, thermometer and water-cooled condenser, 130 grams (1 mol) of itaconic acid, 254 grams (2 mols) of 3,3-dichloropropylene oxide, and 0.5 gram of tin oxalate with a trace of hydroquinone were charged and the mixture heated to 150° C. for 20 hours. Volatile materials were then stripped from the reaction mixture at 200° C. under 1 millimeter of mercury pressure. The residue was a viscous material weighing 349 grams, corresponding to a 91% yield, and confirmed by infrared and chlorine analysis to be the desired polychloroalkyl ester.

The foregoing polyester resin was cross-linked by mixing 60 grams of the polyester with 40 grams of styrene and 0.5 gram of benzoyl peroxide, and curing the resulting mixture overnight at 60° C. followed by a post cure for 6 hours at 100° C. A hard, transparent, clear cured plastic was obtained.

Example 19.—Styrene cross-linked plastic from a fumaric acid-maleic anhydride-trichloropropylene oxide (1:1:4 molar ratio) polyester In a 300-ml. round-bottom flask equipped with a mechanical stirrer, thermometer and water cooled condenser, 9.8 grams (0.1 mol) of maleic anhydride was heated to about 85° C., and about 0.2 gram of freshly sublimed aluminum chloride was then added to form a catalyst complex. To this slurry 11.6 grams (0.1 mol) of fumaric acid and 64.4 grams (0.4 mol) of 3,3,3-trichloropropylene oxide were added and the mixture slowly heated. The mixture was heated to between 182 and 188° C. for 30 minutes during which time complete solution was achieved, and then maintained in this temperature range for an additional 6 hours. At the completion of polymerization, unreacted monomer and water of reaction were stripped at 1 millimeter of mercury pressure for 5 minutes to yield 84 grams of polyester.

A 40% styrene solution was prepared by dissolving 56 grams of styrene with about 0.05 milligram of hydroquinone stabilizer in the above-prepared polyester. A 100 gram sample of this base resin was mixed with 1 mil. of dimethyl phosphite and 0.5 gram of benzoyl peroxide, and cured at 60° C. for 18 hours followed by a post cure at 100° C. for 6 hours. The cross-linked plastic was clear, light amber, similar to that observed for a 1 to 2 molar ratio anhydride-trichloropropylene oxide polychloroalkyl ester system (see Example 1).

Example 20.—Styrene cross-linked plastic from a phthalic anhydride-maleic anhydride-dichloropropylene oxide (1:2:6 molar ratio) polyester A mixture of phthalic anhydride, maleic anhydride and 3,3-dichloropropylene oxide in a molar ratio of 1 to 2 to 6 was reacted for 16 hours at 140° C. in the presence of a stannic chloride catalyst. At the end of this period a 58% conversion was realized, the phthalic anhydride not having reacted completely, even though infrared analysis revealed the presence of both benzene and double bond absorption peaks. By continuing the reaction for an additional 47 hours, a 100% conversion was achieved.

A cross-linked plastic was obtained by heat curing a mixture of 60 parts of the foregoing polychloroalkyl ester and 40 parts of styrene. The plastic showed properties which were less outstanding than those of the corresponding cross-linked polychloroalkyl ester prepared using only maleic anhydride (and no phthalic anhydride).

*Example 21.—Styrene-butadiene rubber cross-linked plastic from a maleic anhydride-dichloropropylene oxide (1:2 molar ratio) polyester*

The following reactants were employed:

| | Parts |
|---|---|
| FRS–1502 (a nonstaining cold styrene-butadiene rubber, containing 23.5% bound styrene, by Firestone Rubber Co.) | 60 |
| Maleic anhydride-dichloropropylene oxide (1:2 molar ratio) polyester as prepared in Example 10 | 40 |
| Philblack O (furnace black) | 40 |
| Zinc oxide | 5 |
| Sulfur | 2 |
| Captax (2-mercaptobenzothiazole-accelerator) | 2 |
| Agerite (phenyl-beta-napthylamine-antioxidant) | 1 |

These reactants were milled together on a rubber mill and cured at 292° F. for 50 minutes, yielding a cured, cross-linked, self-extinguishing plastic material with the following properties:

| | |
|---|---|
| Tensile strength, pounds per square inch | 2060 |
| Elongation, percent | 500 |
| Durometer: Shore A hardness | 86 |
| 300 percent modulus, p.s.i. | 1175 |
| 500 percent modulus, p.s.i. | 1875 |
| Tear resistance, p.s.i. | 320 |

*Example 22.—A styrene cross-linked plastic from a mixture of a maleic anhydride-trichloropropylene oxide (1:2 molar ratio) polyester and a standard commercial polyester*

A standard commercial polyester was initially prepared from 167 parts 1,2-propanediol, 148 parts phthalic anhydride and 98 parts maleic anhydride (2.2:1:1). A mixture containing 25% by weight commercial polyester so prepared and 75% maleic anhydride-trichloropropylene oxide (1:2 molar ratio) polyester as prepared in Example 1 above, both containing 40% styrene monomer, was mixed with 2.5% benzoyl peroxide and 5 ml. dimethylphosphite and cured at 60° C. for 16 hours and post-cured at 100° C. for 6 hours. The resulting polyester plastic was nonburning and had a heat distortion of 90° C., a specific gravity of 1.33, Barcol hardness of 38, tensile strength of 4,756 pounds per square inch, and a water absorption of 0.112% in 24 hours at room temperature. The water absorption was one-third that of the commercial ester cross-linked alone.

*Example 23.—Chemical resistance of various cross-linked polyester plastics*

A series of tests was conducted to determine the chemical resistance of a number of polyhalogenous cross-linked polyester plastics of the present invention. Although an industrial environment involving chemical exposure has many variables which affect the chemical resistivity of a completely cured polyester resin, including temperature, concentrations and combintions of chemicals, physical state of the chemicals, and so forth, an examination into the chemical resistivity of various of the cross-linked polychloroalkyl ester resins as compared with standard commercial resins was made under standardized conditions. Three polyester plastics prepared from 3,3,3-trichloropropylene oxide and maleic anhydride at molar ratios of 1 to 1, 2 to 1, and 3 to 1, and a fourth plastic prepared from trichloropropylene oxide, 3,3-dichloropropylene oxide and maleic anhydride in equimolar ratios, all cross-linked with 40% styrene, were tested using a standard polyester prepared from 167 parts 1,2-propanediol, 148 parts phthalic anhydride and 98 parts maleic anhydride, and cross-linked with 30% styrene as reference standard. Samples of these resins were immersed for 30 days at room temperature in a series of test chemicals which are all reported in the literature as being highly corrosive towards commercially used polyester plastics. These chemicals may be divided into three distinct groups:

I. Basic compounds:
    (a) 28 to 30% aqueous ammonia
    (b) 50% sodium hydroxide
    (c) 5% barium hydroxide
    (d) "Clorox"—5% sodium hypochlorite (alkaline action together with strong oxidative influence)

II. Acidic compounds
    (a) 50% nitric acid
    (b) 100% glacial acetic acid

III. Solvents
    (a) acetone
    (b) ethylene dichloride
        (both of these usually cause strong corrosion by surface creasing and embrittlement)
    (c) distilled water The results of these tests are summarized in Table III. In this table MA represents maleic anhydride, TCPO represents 3,3,3-trichloropropylene oxide, and DCPO represents 3,3-dichloropropylene oxide. Values are figured in percent gain or loss in weight after 30 days' immersion in the test chemicals. The systems employed represented some of the most strenuous which can be devised for polyesters.

TABLE III

| Polyester | Reference Polyester [1] | MA/TCPO 1:1 | MA/TCPO 1:2 | MA/TCPO 1:3 | MA/TCPO/DCPO 1:1:1 |
|---|---|---|---|---|---|
| Test Chemicals: | | | | | |
| Glacial Acetic Acid | 4.45 | 2.21 | 4.17 | 9.59 | 1.27 |
| Ammonium Hydroxide (28–30%) | −4.84 | ([2]) | 8.19 | 1.28 | −3.25 |
| Barium Hydroxide (5%) | 0.97 | 0.26 | 0. | −2.84 | −2.68 |
| Clorox | 1.25 | 0.50 | 0. | −2.76 | −2.65 |
| Nitric Acid (50%) | 4.37 | 1.11 | 0.66 | −1.31 | −1.90 |
| NaOH (50%) | 0.27 | −0.64 | −0.13 | −3.23 | −3.28 |
| Distilled Water | 1.64 | 0.75 | 0.27 | −2.85 | −2.68 |

[1] Same as used in Example 22.
[2] Very brittle and cracked—20 days.

Although solvent resistance in organic solvents, especially acetone, was inferior in some cases for the polychloroalkyl ester systems cross-linked with styrene, it was found that by using a higher cross-linking vinyl-monomer, such as diallylphthalate or triallylcyanurate, in place of the styrene used in the above example, the resistance of the polyester resin against embrittlement and creasing in acetone and ethylene dichloride was markedly improved.

The data also shows the effect of mol ratios upon chemical resistance.

*Example 24.—A laminate from a maleic anhydride and 1,1,1-trichloro-2,3-epoxypropane polychloroester (1:2 molar ratio) cross-linked with styrene*

A 4-ply polychloroester laminating resin mixture was prepared from 400 grams of a 1:2 molar ratio maleic anhydride and 1,1,1-trichloro-2,3-epoxypropane polychloroester, having a molecular weight of about 1070 by boiling point elevation, in solution in 40% styrene to which 2 grams of benzoyl peroxide and 4 ml. of dimethylphosphite were added. Four 19.25 x 12.25 inches fiber glass mats (J. P. Stevens Co., Style 181, sylene treated) were impregnated with 227 grams of the resin mixture, clamped between two glass plates, and cured at 60° C. for 16 hours followed by a post cure at 100° C. for 6 hours. A light amber, nonburning laminate was obtained having a tensile strength of 36,788 pounds per square inch, Barcol hardness of 62, and water absorption (24 hours at room temperature) of 0.082%.

Various modifications and equivalents will be apparent to one skilled in the art and may be made in the compounds, compositions, and process of the present invention without departing from the spirit or scope thereof, and it is therefore to be understood that the invention is to be limited only by the scope of the appended claims.

I claim:

1. A cross-linked polyester resin which is the reaction product of
   (I) an ethylenically unsaturated polyester formed by copolymerizing in admixture reactants consisting essentially of
      (1) a dicarboxylic organic material selected from the group consisting of
         (a) ethylenically unsaturated dicarboxylic acid anhydrides and
         (b) ethylenically unsaturated dicarboxylic acids,
         (c) mixtures of at least one of (a) and (b) with a member of the group consisting of saturated dicarboxylic acid anhydrides and acids, and dicarboxylic acid anhydrides and acids free of other than aromatic unsaturation, the total amount of ethylenically unsaturated dicarboxylic material as defined in (a) and (b) being present in amount of at least about 40% by weight of the total amount of dicarboxylic material as defined in (c), and
      (2) a vicinal alkylene oxide selected from the group consisting of
         (a') a vicinal alkylene oxide containing from 3 to 4 carbon atoms, inclusive, and having an alkyl group attached to a carbon atom of the oxirane ring, said alkyl group having up to 2 carbon atoms and containing at least 2 halogen atoms, each halogen having an atomic weight of 19 to 80, inclusive, and
         (b') an alkylene oxide as defined in (a') together with a vicinal alkylene oxide, selected from the group consisting of saturated alkylene oxides and alkylene oxides which are free from other than aromatic unsaturation, having as a substituent attached to a carbon atom of the oxirane ring a member of the group consisting of hydrogen and an alkyl group, said alkyl group having up to 2 carbon atoms inclusive and containing from 0 to 1 halogen atom, inclusive, any halogen having an atomic weight of 19 to 80, inclusive, said alkylene oxide as defined in (a') being present in amount of at least about 50% by weight of the total amount of alkylene oxide as defined in (b'),
   the molar ratio of (1) and (2) being about 1:1 to about 1:6,
   said polyester being characterizer by the presence of pendant haloalkyl groups which have up to 2 carbon atoms and which contain at least 2 halogen atoms, and
   (II) an ethylenically unsaturated cross-linking agent, said cross-linked polyester being characterized by the presence of haloalkyl groups which have up to 2 carbon atoms and which contain at least 2 halogen atoms, and by a relatively high order of nonflammability and chemical resistance.

2. A cross-linked polyester resin which is the reaction product of
   (I) a polyester formed by copolymerizing in admixture reactants consisting essentially of
      (1) a member of the group consisting of ethylenically unsaturated organic dicarboxylic acid anhydrides and acids, and
      (2) a 3,3,3-trihelopropylene oxide, (1) and (2) being in a molar ratio of about 1:1 to about 1:6, and
   (II) an ethylenically unsaturated cross-linking agent.

3. A cross-linked polyester resin which is the reaction product of
   (I) a polyester formed by copolymerizing in admixture reactants consisting essentially of
      (1) maleic anhydride and
      (2) 3,3,3-trichloropropylene oxide, (1) and (2) being in a molar ratio of about 1:1 to about 1:6, and
   (II) an ethylenically unsaturated cross-linking agent.

4. A cross-linked polyester resin of claim 3, wherein said cross-linking agent comprises styrene.

5. A cross-linked polyester resin of claim 3, wherein said cross-linking agent comprises an alkyl methacrylate.

6. A cross-linked polyester resin of claim 3, wherein said cross-linking agent comprises styrene and butyl methacrylate.

7. A cross-linked polyester resin of claim 3, wherein said cross-linking agent comprises diallylphthalate.

8. A cross-linked polyester resin of claim 3, wherein said cross-linking agent comprises triallyl isocyanurate.

9. A cross-linked polyester resin of claim 3, wherein said cross-linking agent comprises vinyl toluene.

10. A cross-linked polyester resin which is the reaction product of
    (I) a polyester formed by copolymerizing in admixture reactants consisting essentially of
       (1) a member of the group consisting of ethylenically unsaturated organic dicarboxylic acid anhydrides and acids, and
       (2) a 3,3-dihalopropylene oxide, (1) and (2) being in a molar ratio of about 1:1 to about 1:6, and
    (II) an ethylenically unsaturated cross-linking agent.

11. A cross-linked polyester resin which is the reaction product of
    (I) a polyester formed by copolymerizing in admixture reactants consisting essentially of
       (1) maleic anhydride and
       (2) 3,3-dichloropropylene oxide, (1) and (2) being in a molar ratio of about 1:1 to about 1:6, and
    (II) an ethylenically unsaturated cross-linking agent.

12. A cross-linked polyester resin of claim 11, wherein said cross-linking agent comprises styrene.

13. A cross-linked polyester resin of claim 11, wherein said cross-linking agent comprises a butadiene rubber.

14. A cross-linked polyester resin which is the reaction product of
    (I) a polyester formed by copolymerizing in admixture reactants consisting essentially of
       (1) maleic anhydride, (2) 3,3,3-trichloropropylene oxide, and
(3) 3,3-dichloropropylene oxide, the number of mols of (1) and the sum of the number of mols of (2) and (3) being in a ratio of about 1:1 to about 1:6, and (II) an ethylenically unsaturated cross-linking agent.

15. A cross-linked polyester resin of claim 14, wherein said cross-linking agent comprises styrene.

16. A cross-linked polyester resin which is the reaction product of
(I) a polyester formed by copolymerizing in admixture reactants consisting essentially of
(1) maleic anhydride,
(2) 3,3,3-trichloropropylene oxide, and
(3) propylene oxide, the number of mols of (1) and the sum of the number of mols of (2) and (3) being in a ratio of about 1:1 to about 1:6, and (II) an ethylenically unsaturated cross-linking agent.

17. A cross-linked polyester resin of claim 16, wherein said cross-linking agent comprises styrene.

18. A cross-linked polyester resin which is the reaction product of
(I) a polyester formed by copolymerizing in admixture reactants consisting essentially of
(1) maleic anhydride and
(2) 3-bromo-3,3-dichloropropylene oxide, (1) and (2) being in a molar ratio of about 1:1 to about 1:6, and (II) an ethylenically unsaturated cross-linking agent.

19. A cross-linked polyester resin of claim 18, wherein said cross-linking agent comprises styrene.

20. A cross-linked polyester resin which is the reaction product of
(I) a polyester formed by copolymerizing in admixture reactants consisting essentially of
(1) maleic anhydride and
(2) 1,1,1-trichloro-3,4-epoxybutane, (1) and (2) being in a molar ratio of about 1:1 to about 1:6, and (II) an ethylenically unsaturated cross-linking agent.

21. A cross-linked polyester resin of claim 20, wherein said cross-linking agent comprises styrene.

22. A cross-linked polyester resin which is the reaction product of
(I) a polyester formed by copolymerizing in admixture reactants consisting essentially of
(1) fumaric acid and
(2) 3,3,3-trichloropropylene oxide, (1) and (2) being in a molar ratio of about 1:1 to about 1:6, and (II) an ethylenically unsaturated cross-linking agent.

23. A cross-linked polyester resin of claim 22, wherein said cross-linking agent comprises styrene.

24. A cross-linked polyester resin which is the reaction product of
(I) a polyester formed by copolymerizing in admixture reactants consisting essentially of
(1) itaconic acid and
(2) 3,3-dichloropropylene oxide, (1) and (2) being in a molar ratio of about 1:1 to about 1:6, and (II) an ethylenically unsaturated cross-linking agent.

25. A cross-linked polyester resin of claim 24, wherein said cross-linking agent comprises styrene.

26. A cross-linked polyester resin which is the reaction product of
(I) a polyester formed by copolymerizing in admixture reactants consisting essentially of
(1) maleic anhydride,
(2) fumaric acid, and
(3) 3,3,3-trichloropropylene oxide, the sum of the number of mols of (1) and (2) and the number of mols of (3) being in a ratio of about 1:1 to about 1:6, and (II) an ethylenically unsaturated cross-linking agent.

27. A cross-linked polyester resin of claim 26, wherein said cross-linking agent comprises styrene.

28. A cross-linked polyester resin which is the reaction product of
(I) a polyester formed by copolymerizing in admixture reactants consisting essentially of
(1) phthalic anhydride,
(2) maleic anhydride, (2) being present in amount of at least about 40% by weight of (1) and (2), and
(3) 3,3-dichloropropylene oxide, the sum of the number of mols of (1) and (2) and the number of mols of (3) being in a ratio of about 1:1 to about 1:6, and (II) an ethylenically unsaturated cross-linking agent.

29. A cross-linked polyester resin of claim 28, wherein said cross-linking agent comprises styrene.

30. A process for preparing a cross-linked polyester resin comprising reacting
(I) an ethylenically unsaturated polyester formed by copolymerizing in admixture reactants consisting essentially of
(1) a dicarboxylic organic material selected from the group consisting of
(a) ethylenically unsaturated dicarboxylic acid anhydrides and
(b) ethylenically unsaturated dicarboxylic acids,
(c) mixtures of at least one of (a) and (b) with a member of the group consisting of saturated dicarboxylic acid anhydrides and acids and dicarboxylic acid anhydrides and acids free of other than aromatic unsaturation, the total amount of ethylenically unsaturated dicarboxylic material as defined in (a) and (b) being present in amount of at least about 40% by weight of the total amount of dicarboxylic material as defined in (c), and
(2) an alkylene oxide, selected from the group consisting of
(a') a vicinal alkylene oxide containing from 3 to 4 carbon atoms, inclusive, and having an alkyl group attached to a carbon atom of the oxirane ring, said alkyl group having up to 2 carbon atoms and containing at least 2 halogen atoms, each halogen having an atomic weight of 19 to 80, inclusive, and
(b') an alkylene oxide as defined in (a') together with a vicinal alkylene oxide, selected from the group consisting of saturated alkylene oxides and alkylene oxides which are free from other than aromatic unsaturation, having as a substituent attached to a carbon atom of the oxirane ring a member of the group consisting of hydrogen and an alkyl group, said alkyl group having up to 2 carbon atoms and containing from 0 to 1 halogen atom, inclusive, any halogen having an atomic weight of 19 to 80, inclusive, said alkylene oxide as defined in (a') being present in amount of at least about 50% by weight of the total amount of alkylene oxide as defined in (b'), and
the molar ratio of (1) to (2) being about 1:1 to about 1:6, (II) an ethylenically unsaturated cross-linking agent, in the presence of a vinyl polymerization initiator.

31. A process for preparing a cross-linked polyester resin comprising reacting
(I) an ethylenically unsaturated polyester formed by copolymerizing in admixture reactants consisting essentially of (1) a member selected from the group consisting of ethylenically unsaturated organic dicarboxylic acid anhydrides and acids and
(2) a 3,3,3-trihalopropylene oxide, (1) and (2) being present in a molar ratio of about 1:1 to about 1:6, and
(II) an ethylenically unsaturated cross-linking agent, in the presence of a vinyl polymerization initiator.

32. A process for preparing a cross-linked polyester resin comprising reacting
(I) an ethylenically unsaturated polyester formed by copolymerizing in admixture reactants consisting essentially of
(1) maleic anhydride and
(2) 3,3,3-trichloropropylene oxide, (1) and (2) being in a molar ratio of about 1:1 to about 1:6, and
(II) an ethylenically unsaturated cross-linking agent, in the presence of a vinyl polymerization initiator.

33. A process of claim 32, wherein said cross-linking agent comprises styrene.

34. A process of claim 32, wherein said cross-linking agent comprises an alkyl methacrylate.

35. A process of claim 32, wherein said cross-linking agent comprises styrene and butyl methacrylate.

36. A process of claim 32, wherein said cross-linking agent comprises diallylphthalate.

37. A process of claim 32, wherein said cross-linking agent comprises triallylisocyanurate.

38. A process of claim 32, wherein said cross-linking agent comprises vinyl toluene.

39. A process for preparing a cross-linked polyester resin comprising reacting
(I) an ethylenically unsaturated polyester formed by copolymerizing in admixture reactants consisting essentially of
(1) a member selected from the group consisting of ethylenically unsaturated organic dicarboxylic anhydrides and acids and
(2) a 3,3-dihalopropylene oxide, (1) and (2) being present in a molar ratio of about 1:1 to about 1:6, and
(II) an ethylenically unsaturated cross-linking agent, in the presence of a vinyl polymerization initiator.

40. A process for preparing a cross-linked polyester resin comprising reacting
(I) an ethylenically unsaturated polyester formed by copolymerizing in admixture reactants consisting essentially of
(1) maleic anhydride and
(2) 3,3-dichloropropylene oxide, (1) and (2) being in a molar ratio of about 1:1 to about 1:6, and
(II) an ethylenically unsaturated cross-linking agent, in the presence of a vinyl polymerization initiator.

41. A process of claim 40, wherein said cross-linking agent comprises styrene.

42. A process of claim 40, wherein said cross-linking agent comprises a butadiene rubber.

43. A process for preparing a cross-linked polyester resin comprising reacting
(I) an ethylenically unsaturated polyester formed by copolymerizing in admixture reactants consisting essentially of
(1) maleic anhydride,
(2) 3,3,3-trichloropropylene oxide, and
(3) 3,3-dichloropropylene oxide, the number of mols of (1) and the sum of the number of mols of (2) and (3) being in a ratio of about 1:1 to about 1:6, and
(II) an ethylenically unsaturated cross-linking agent, in the presence of a vinyl polymerization initiator.

44. A process of claim 43, wherein said cross-linking agent comprises styrene.

45. A process for preparing a cross-linked polyester resin comprising reacting
(I) an ethylenically unsaturated polyester formed by copolymerizing in admixture reactants consisting essentially of
(1) maleic anhydride,
(2) 3,3,3-trichloropropylene oxide, and
(3) propylene oxide, the number of mols of (1) and the sum of the number of mols of (2) and (3) being in a ratio of about 1:1 to about 1:6, and
(II) an ethylenically unsaturated cross-linking agent, in the presence of a vinyl polymerization initiator.

46. A process of claim 45, wherein said cross-linking agent comprises styrene.

47. A process for preparing a cross-linked polyester resin comprising reacting
(I) an ethylenically unsaturated polyester formed by copolymerizing in admixture reactants consisting essentially of
(1) maleic anhydride and
(2) 3-bromo-3,3-dichloropropylene oxide, (1) and (2) being in a molar ratio of about 1:1 to about 1:6, and
(II) an ethylenically unsaturated cross-linking agent, in the presence of a vinyl polymerization initiator.

48. A process of claim 47, wherein said cross-linking agent comprises styrene.

49. A process for preparing a cross-linked polyester resin comprising reacting
(I) an ethylenically unsaturated polyester formed by copolymerizing in admixture reactants consisting essentially of
(1) maleic anhydride and
(2) 1,1,1-trichloro-3,4-epoxybutane, (1) and (2) being in a molar ratio of about 1:1 to about 1:6, and
(II) an ethylenically unsaturated cross-linking agent, in the presence of a vinyl polymerization initiator.

50. A process of claim 49, wherein said cross-linking agent comprises styrene.

51. A process for preparing a cross-linked polyester resin comprising reacting
(I) an ethylenically unsaturated polyester formed by copolymerizing in admixture reactants consisting essentially of
(1) fumaric acid and
(2) 3,3,3-trichloropropylene oxide, (1) and (2) being in a molar ratio of about 1:1 to about 1:6, and
(II) an ethylenically unsaturated cross-linking agent, in the presence of a vinyl polymerization initiator.

52. A process of claim 51, wherein said cross-linking agent comprises styrene.

53. A process for preparing a cross-linked polyester resin comprising reacting
(I) an ethylenically unsaturated polyester formed by copolymerizing in admixture reactants consisting essentially
(1) itaconic acid and
(2) 3,3-dichloropropylene oxide, (1) and (2) being in a molar ratio of about 1:1 to about 1:6, and
(II) an ethylenically unsaturated cross-linking agent, in the presence of a vinyl polymerization initiator.

54. A process of claim 53, wherein said cross-linking agent comprises styrene.

55. A process for preparing a cross-linked polyester resin comprising reacting
(I) an ethylenically unsaturated polyester formed by copolymerizing in admixture reactants consisting essentially of
(1) maleic anhydride,
(2) fumaric acid, and
(3) 3,3,3-trichloropropylene oxide, the sum of the number of mols of (1) and (2) and the number of mols of (3) being in a ratio of about 1:1 to about 1:6, and (II) an ethylenically unsaturated cross-linking agent, in the presence of a vinyl polymerization initiator.

56. A process of claim 55, wherein said cross-linking agent comprises styrene.

57. A process for preparing a cross-linked polyester resin comprising reacting
(I) an ethylenically unsaturated polyester formed by copolymerizing in admixture reactants consisting essentially of
 (1) phthalic anhydride, and
 (2) maleic anhydride, (2) being present in amount of at least about 40% by weight of (1) and (2), and
 (3) 3,3-dichloropropylene oxide, the sum of the number of mols of (1) and (2) and the number of mols of (3) being in a ratio of about 1:1 to about 1:6, and
(II) an ethylenically unsaturated cross-linking agent, in the presence of a vinyl polymerization initiator.

58. A process of claim 57, wherein said cross-linking agent comprises styrene.

59. A cross-linked polyester according to claim 1 which is the reaction product of an ethylenically unsaturated cross-linking agent (II) and an unsaturated polyester (I), said unsaturated polyester (I) having a molecular weight between about 275 and about 2500 and containing the following recurring structural units:

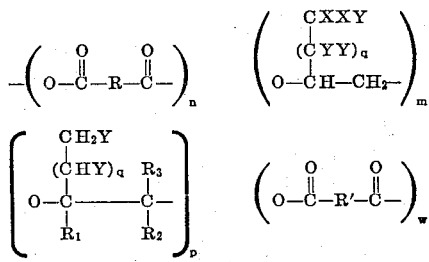

the respective subunits thereof being designated: "A," "B," "C" and "D," in that order, wherein R is the residue of an ethylenically unsaturated organic dibasic acid anhydride having up to and including 12 carbon atoms and R' is the residue of an organic dibasic acid having up to and including 12 carbon atoms and selected from the group consisting of saturated and aromatically unsaturated dibasic acids, Y is selected from the group consisting of hydrogen and halogen having an atomic weight of 19 to 80, inclusive no more than one Y in subunit "C" being halogen, X is halogen having an atomic weight of 19 to 80, inclusive, $q$ and $w$ are independently selected from 0 and 1, $n$ and $m$ are integers from 1 to 3, inclusive, $p$ is selected from 0 and an integer from 1 to 3, inclusive, $R_1$, $R_2$, and $R_3$ are the same or different and are selected from the group consisting of hydrogen and saturated and aromatically unsaturated organic radicals, the maximum number of carbon atoms in $R_1$, $R_2$, and $R_3$ combined being 16, the weight of all subunits "C" when present not exceeding about 50% of the combined weight of all subunits "B" and "C" taken together, and the weight of all subunits "D" when present not exceeding about 40% of the combined weight of all subunits "A" and "D" when taken together, and the subunits "A," "B," "C," and "D" being present in the recurring structural units in any order.

60. A cross-linked polyester according to claim 59, wherein the starting unsaturated polyester has a molecular weight of about 1000 to about 2000.

61. A cross-linked polyester reaction product of claim 59, containing up to about 25% by weight of total starting polyester of an ethylenically unsaturated polyester (Ia), which is devoid of pendant polyhaloalkyl groups, integrally co-cross-linked with the polyhalogenous ethylenically unsaturated polyester (I) and with the cross-linking agent (II).

62. The product of claim 61, wherein the unsaturated polyester (Ia) is a nonhalogenous polyester.

63. A process for preparing a cross-linked polyester product according to claim 30 wherein, in addition to the polyhalogenous ethylenically unsaturated polyester (I), up to about 25% by weight of total polyester reactant of another ethylenically unsaturated polyester (Ia), which is devoid of the pendant polyhaloalkyl groups, is integrally reacted and co-cross-linked with the cross-linking agent (II).

64. The process of claim 63, wherein the unsaturated polyester (Ia) is a nonhalogenous polyester.

65. A cross-linked polyester formed by copolymerizing in admixing reactants consisting essentially of maleic anhydride and 3,3,3-trichloropropylene oxide in a molar ratio between about 1:1 and about 1:2, cross-linked with about 20 to 50% by weight of styrene.

66. A cross-linked polyester formed by copolymerizing in admixing reactants consisting essentially of maleic anhydride and 3,3-dichloropropylene oxide in a molar ratio between about 1:1 and about 1:2, cross-linked with about 20 to 50% by weight of styrene.

67. A process for preparing a cross-linked polyester comprising reacting (I) a polyester formed by copolymerizing in admixturing reactants consisting essentially of maleic anhydride and 3,3,3-trichloropropylene oxide in a molar ratio between about 1:1 and about 1:2 and (II) about 20 to 50% by weight of styrene, in the presence of a vinyl polymerization initiator.

68. A process for preparing a cross-linked polyester comprising reacting (I) a polyester formed by copolymerizing in admixturing reactants consisting essentially of maleic anhydride and 3,3-dichloropropylene oxide in a molar ratio between about 1:1 and about 1:2 and (II) about 20 to 50% by weight of styrene, in the presence of a vinyl polymerization initiator.

References Cited by the Examiner

UNITED STATES PATENTS

| 2,822,350 | 2/1958 | Hayes | 260—75 |
| 2,909,501 | 12/1959 | Robitsheck et al. | 260—869 |
| 3,060,146 | 10/1962 | Wismer et al. | 260—75 |
| 3,089,863 | 5/1963 | Hicks et al. | 260—75 |

FOREIGN PATENTS 884,033  12/1961  Great Britain.

OTHER REFERENCES

Pacquin A., "Epoxydverbindungen und Epoxydharze," Springer Verlag, Berlin, 1958 (page 241 relied upon).

MURRAY TILLMAN, *Primary Examiner.*

J. T. GOOLKASIAN, *Assistant Examiner.*